May 17, 1932. L. W. WYMAN 1,858,427
FLUME JOINT SUPPORT
Filed July 24, 1931
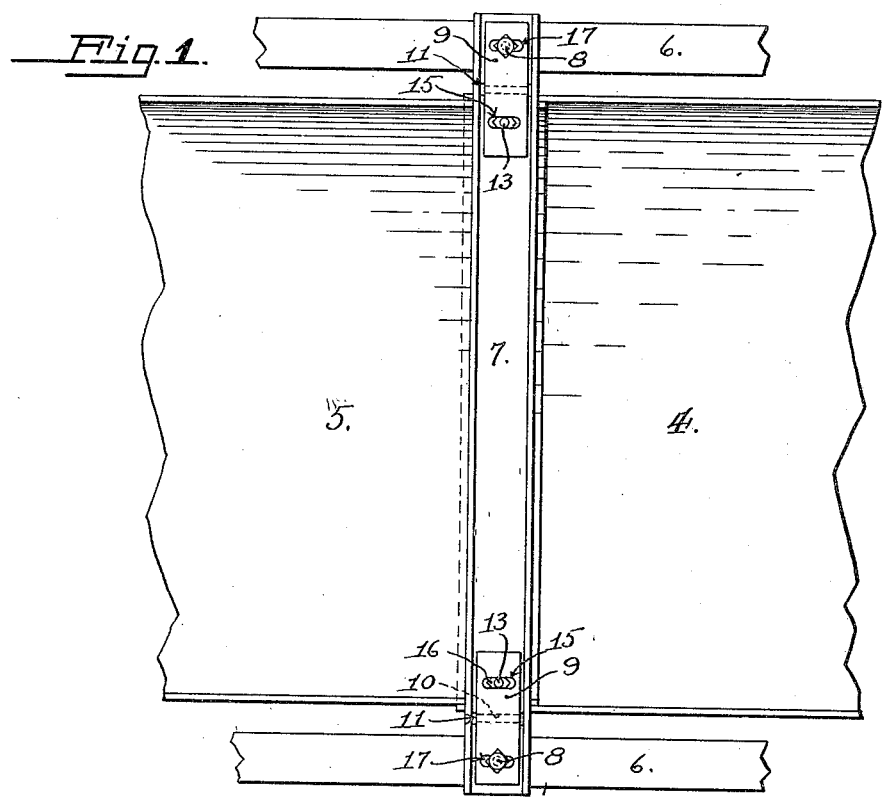
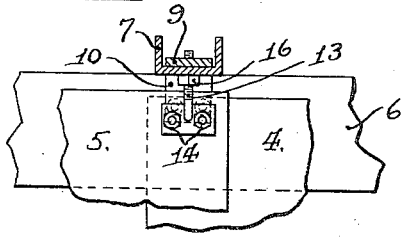
INVENTOR,
Laurence W. Wyman
BY Booth & Booth
ATTORNEYS.

Patented May 17, 1932

1,858,427

UNITED STATES PATENT OFFICE

LAURENCE W. WYMAN, OF OAKLAND, CALIFORNIA, ASSIGNOR TO CALIFORNIA CORRUGATED CULVERT COMPANY, OF BERKELEY, CALIFORNIA, A CORPORATION OF CALIFORNIA

FLUME JOINT SUPPORT

Application filed July 24, 1931. Serial No. 552,945.

The present invention relates to means for supporting and maintaining a tight joint between the adjacent ends of sheet metal flume sections.

The principal object of the invention is to provide a joint supporting structure which is simple and inexpensive to manufacture and assemble and which is capable of maintaining a tight joint for a long period of time without attention. Another object is to provide a structure which is especially suitable for use with a simple lap joint between the adjacent ends of the flume sections. This form of joint is advantageous because it presents a practically smooth interior surface, and also because it eliminates the necessity for forming beads or flanges upon the ends of the flume sections, such beads or flanges being costly to manufacture and having a tendency to injure the galvanizing or other protective coating of the flume sheets. A still further object is to provide a structure capable of supporting the flume by attachment to the sheets themselves without the necessity for suspension rods or other separate means of support.

These and other objects and advantages of the invention will become apparent from the following specification, which should be read with the understanding that the form, construction and arrangement of the several parts may be varied, within the limits of the claims hereto appended, without departing from the spirit of the invention as set forth in said claims.

A preferred form of the invention is illustrated in the accompanying drawings in which Fig. 1 is a plan view of the joint supporting structure.

Fig. 2 is a transverse section thereof, and

Fig. 3 is a sectional detail taken on the line 3—3 of Fig. 2.

In the drawings, the reference numerals 4 and 5 designate two adjacent joined sections of a sheet metal flume. Their ends are straight, that is to say without beads or flanges, and are overlapped to form the joint. The numeral 6 designates any suitable form of frame or substructure upon which the flume is carried, and which may be in the form of longitudinal stringers as indicated, or merely individual posts, or any other form common in this art.

A crosspiece 7 extends across and rests upon the supports 6 and may be secured thereto in any suitable manner represented by screws 8. The crosspiece 7 is preferably of channel section steel positioned with its channeled side up as shown. Resting upon and within the crosspiece 7 are a pair of T-shaped brackets 9. The depending leg 10 of each bracket extends through a slot 11 in the bottom of the crosspiece 7, and is secured to the upper edge portion of the outer flume section 4 by any suitable means indicated as bolts 12. To the upper edges of the inner flume section 5 are secured a pair of compression lugs 13 by any suitable means such as bolts 14. The lugs 13 have threaded stems which extend upwardly through the slots 15 in the crosspiece 7 and the T-brackets 9. Nuts 16 are threaded upon the stems of the lugs 13 below the crosspiece 7. The screws 8 securing the crosspiece 7 to the supports 6 preferably extend through slots 17 in both the T-brackets 9 and said crosspiece.

It will be seen that the weight of the flume is carried by the depending legs 10 of the T-brackets 9, and is transferred by said brackets to the crosspiece 7 and the supports 6. By having the outer horizontal arms of the brackets 9 overlie the supports 6, the crosspiece 7 is relieved of a considerable portion of the weight of the flume, and may be made lighter than would be necessary otherwise. By screwing up on the nuts 16 against the lower side of the crosspiece 7, the inner flume section 5 is placed under compression and forced downwardly against the outer section 4 to form a tight joint. When once tightened, this joint is permanent; there are no wooden parts involved to shrink or decay, and loading of the flume tends to increase rather than decrease the tightness of the joint, because any downward deflection of the center of the crosspiece 7 increases the tension upon the outer flume section 4 and the compression upon the inner section 5. The simple lap form of the joint between the sections 4 and 5 and the slots in the crosspiece 7 and the T-brackets 9 permits sufficient relative end-wise movement between the flume sections to provide for expansion and contraction.

I claim:—

1. A sheet metal flume comprising a pair of trough sections having their ends overlapping to form a joint; a supporting crosspiece positioned above said joint; a T-shaped bracket carried by said crosspiece, said bracket having its depending leg secured to the upper edge portion of the outer trough section; a lug secured to the upper edge portion of the inner section, said lug movably engaging one horizontal arm of said bracket; and means for forcing said lug downwardly to tighten said joint.

2. A sheet metal flume comprising a pair of trough sections having their ends overlapping to form a joint; a supporting crosspiece positioned above said joint; a T-shaped bracket carried by said crosspiece, said bracket having its depending leg secured to the upper edge portion of the outer trough section; a threaded lug secured to the upper edge portion of the inner section, said lug extending movably through one horizontal arm of said bracket; and a nut upon said lug below said bracket adapted to force said lug downwardly to tighten said joint.

3. A sheet metal flume comprising a pair of trough sections having their ends overlapping to form a joint; a supporting crosspiece positioned above said joint; a T-shaped bracket having its horizontal arms resting upon said crosspiece and its depending leg extending through said crosspiece and secured to the upper edge portion of the outer trough section; a threaded lug secured to the upper edge portion of the inner section, said lug extending movably through said crosspiece and one arm of said bracket; and a nut upon said lug bearing against the bottom of said crosspiece to tighten said joint.

4. A sheet metal flume comprising a pair of trough sections having their ends overlapping to form a joint; a support beside said trough; a crosspiece positioned above said joint and having its end carried by said support; a bracket having a horizontal arm associated with said crosspiece and extending above said support, and a depending leg secured to the upper edge portion of the outer trough section; a lug secured to the upper edge portion of the inner section and movably engaging said crosspiece; and means for forcing said lug downwardly to tighten said joint.

5. A sheet metal flume comprising a pair of trough sections having their ends overlapping to form a joint; a support beside said trough; a T-shaped bracket having one horizontal arm carried by said support and its depending leg secured to the upper edge portion of the outer trough section; a threaded lug secured to the upper edge portion of the inner section and extending movably through the other horizontal arm of said bracket; and a nut upon said lug below said bracket adapted to force said lug downwardly to tighten said joint.

In testimony whereof I have signed my name to this specification.

LAURENCE W. WYMAN.